(12) United States Patent
Joseph

(10) Patent No.: US 11,716,241 B1
(45) Date of Patent: Aug. 1, 2023

(54) METHODS, SYSTEMS, AND COMPUTER READABLE MEDIA FOR ACTIVELY DIAGNOSING AND REMEDIATING PERFORMANCE DEGRADATION IN A PRODUCTION NETWORK

(71) Applicant: Keysight Technologies, Inc., Santa Rosa, CA (US)

(72) Inventor: Vinod Joseph, Thousand Oaks, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/692,802

(22) Filed: Mar. 11, 2022

(51) Int. Cl.
*H04L 41/0654* (2022.01)
*H04L 43/06* (2022.01)
*H04L 43/50* (2022.01)

(52) U.S. Cl.
CPC .......... *H04L 41/0654* (2013.01); *H04L 43/06* (2013.01); *H04L 43/50* (2013.01)

(58) Field of Classification Search
CPC ............................ H04L 41/0654; H04L 43/50
See application file for complete search history.

(56) References Cited

U.S. PATENT DOCUMENTS

| | | | |
|---|---|---|---|
| 7,583,587 B2* | 9/2009 | Qiu | H04L 43/08 370/242 |
| 9,923,787 B2 | 3/2018 | Ngoo et al. | |
| 10,275,331 B1 | 4/2019 | Gudka et al. | |
| 10,484,257 B1* | 11/2019 | Louca | H04L 43/04 |
| 10,904,100 B1 | 1/2021 | Puttur et al. | |
| 11,050,770 B2 | 6/2021 | Nanda et al. | |
| 2013/0290512 A1* | 10/2013 | Ngoo | H04L 41/0681 709/224 |
| 2019/0163560 A1* | 5/2019 | Purushothaman | G06F 11/0787 |
| 2019/0171513 A1* | 6/2019 | Purushothaman | H04L 41/16 |
| 2021/0344582 A1* | 11/2021 | Samadi | H04L 43/0852 |
| 2022/0277075 A1* | 9/2022 | Cummings | H04W 28/0215 |

OTHER PUBLICATIONS

Parikh, "Designing a Network Validation Pipeline," Intentionet, https://www.intentionet.com/blog/designing-a-network-validation-pipeline/, pp. 1-8 (Mar. 15, 2019).

* cited by examiner

*Primary Examiner* — Philip C Lee

(57) ABSTRACT

Methods, systems, and computer readable media for actively diagnosing and remediating performance degradation in a production network. An example system includes at least one event correlation engine configured for identifying a performance degradation event in the production network; correlating network log and event data with the performance degradation event; and storing at least some of the network log and event data for simulating the performance degradation event. The system includes a remediation engine configured for determining a production network remediation plan and determining a test plan for the production network remediation plan. The system includes at least one network simulation engine configured for simulating the production network using the stored at least some of the network log and event data and the production network remediation plan; executing the test plan; and generating a test result for the production network remediation plan based on executing the test plan.

18 Claims, 6 Drawing Sheets

| Event # | Event Type | Timestamp | Dependency |
|---|---|---|---|
| 3 | Device '2' : Forwarding packet drop | X | Depends on event 2 |
| 2 | Routing Protocol Failure | X - a | Depends on event 1 |
| 1 | Destination Gateway Address failure | X – a - b | Depends on root event 0 |
| 0 | Root event : Link down | X – a – b - c | Root event |

| Event | Timestamp |
|---|---|
| Device '2' : Forwarding packet reroute | X + b |

FIG. 3C

METHODS, SYSTEMS, AND COMPUTER READABLE MEDIA FOR ACTIVELY DIAGNOSING AND REMEDIATING PERFORMANCE DEGRADATION IN A PRODUCTION NETWORK

TECHNICAL FIELD

The subject matter described herein relates to network testing. More specifically, the subject matter relates to methods, systems, and computer readable media for actively diagnosing and remediating performance degradation in a production network.

BACKGROUND

Computer and telecommunication networks continue to increase in size and complexity. Both of these factors have caused network designers, operators, and users to rely on modeling software to assist them in simulating network configurations. For example, network simulations can be used to evaluate performance of network configurations under defined traffic conditions. Performance can be measured by objective criteria such as response time, throughput, and costs of transmissions. Performance measurement, however, does not lead directly to remediating performance degradation.

Accordingly, a need exists for methods, systems, and computer readable media for actively diagnosing and remediating performance degradation in a production network.

SUMMARY

Methods, systems, and computer readable media for actively diagnosing and remediating performance degradation in a production network. An example system includes at least one event correlation engine configured for identifying a performance degradation event in the production network; correlating network log and event data with the performance degradation event; and storing at least some of the network log and event data for simulating the performance degradation event. The system includes a remediation engine configured for determining a production network remediation plan and determining a test plan for the production network remediation plan. The system includes at least one network simulation engine configured for simulating the production network using the stored at least some of the network log and event data and the production network remediation plan; executing the test plan; and generating a test result for the production network remediation plan based on executing the test plan.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3C shows example event correlation graphs; and

DETAILED DESCRIPTION

This document describes methods, systems, and computer readable media for actively diagnosing and remediating performance degradation in a production network. In some examples, the system can be used to improve system and/or network reliability and performance by providing live log and event feeds to offline network simulation and correlation engines.

The system can mine and simulate replay of real network incidents via a combination of online (production network) and offline (simulation network) network feeds, event analysis, correlation and replay and subsequent error correction via live deployment staging and software upgrades.

The system can aid offline debugging and subsequent automatic and/or user-provisioned upgrades with an improvement once the software components in the network achieve a target resilience.

The system can feed analytics from offline simulation analysis back into a production network for tuning and guarding against similar future failures.

Figure 1:
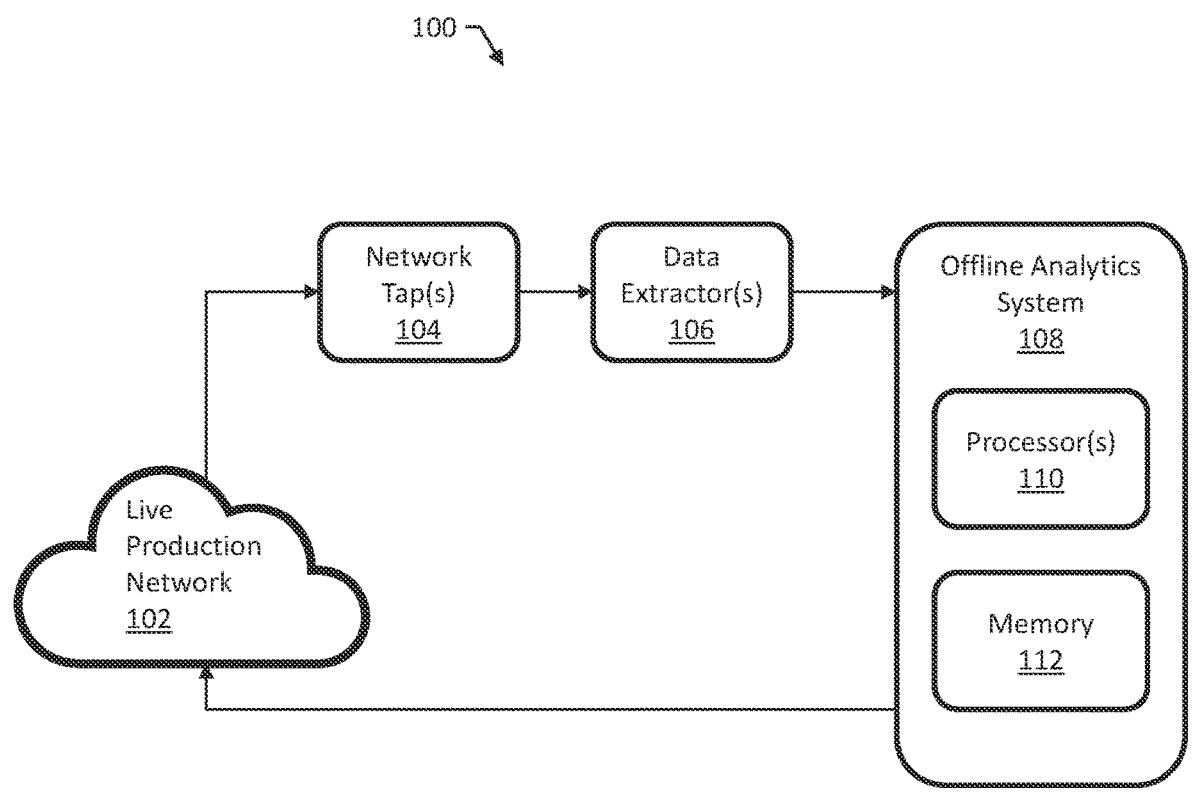
FIG. 1 is a block diagram of an example network environment for a system for actively diagnosing and remediating performance degradation in a production network.

FIG. 1 is a block diagram of an example network environment 100 for a system for actively diagnosing and remediating performance degradation in a production network.

The network environment 100 includes a live production network 102. The live production network 102 is a data communications network including various computing devices and networking devices configured for routing data communications messages between the computing devices.

The network environment 100 can include one or more network taps 104 for capturing traffic flowing on the live production network 102. The network taps 104 can be, e.g., virtual taps or physical taps or both.

The network environment 100 includes one or more data extractors 106 for selecting, extracting, or filtering at least some of the traffic flowing on the live production network 102. In some examples, the data extractors 106 are configured for extracting network log and event data from the traffic flowing on the live production network 102. The data extractors 106 can be implemented on any appropriate computing device, for example, a network monitoring system such as the network packet broker made by Keysight®. The network log and event data can include one or more of: control and user plane packets, system log information, flow records, and network and device configuration information. In some examples, the network log and event data can include syslog information, Netconf informing, NetFlow data, packet capture (PCAP) data, other control and user plane information, and copies of packet flows.

The network environment 100 includes an offline analytics system 108. The offline analytics system 108 is "offline" in the sense that the offline analytics system 108 is apart from the live production network 102, even though the offline analytics system 108 is in communication with the live production network 102. The offline analytics system 108 is a computing system including one or more processors 110 and memory 112 storing instructions for the processor 110.

In general, the offline analytics system 108 is configured, by virtue of appropriate programming, for receiving the network log and event data and analyzing the network log and event data to identify performance degradation events. The offline analytic system 108 can then correlate network log and event data with the performance degradation events.

A performance degradation event is an event at a specific time or time range where the live production network 102 is operating below a threshold. For example, a performance degradation event can be a period where latency is increased above a threshold, a time when a certain number of packets are dropped, a time where an error rate exceeds a threshold, a time when a node or a link fails, or a time where a measure of congestion exceeds a threshold. In some examples, a performance degradation event can be specified by a dependency and timeline graph of <event, timeline>node failure(s), link failure(s), node congestion, link congestion, node functional failures (e.g., forwarding plane failure, control plane failure).

The offline analytics system 108 can determine, for a performance degradation event, a production network remediation plan. Determining a production network remediation plan can include receiving a manual specification of the production network remediation plan from a user or automatically generating the production network remediation plan based on one or more prestored production network remediation plans. The production network remediation plan specifies changes to be made to the live production network 102 in an effort to avoid future performance degradation events similar to the identified performance degradation event. For example, a performance remediation plan can include changes to network device configurations or changes to the network topology (e.g., inclusion or removal of physical and/or virtual devices) or both.

The offline analytics system 108 can then determine a test plan for the performance remediation plan and test the performance remediation plan by simulating the live production network 102 in a simulated network that implements the performance remediation plan. If the offline analytics system 108 is able to validate the performance remediation plan after executing the test plan, then the offline analytics system 108 can deploy the validated performance remediation plan to the live production network 102, e.g., automatically or manually by an operator. If the offline analytics system 108 is unable to validate the performance remediation plan, then the offline analytics system 108 can repeat the process and determine a new performance remediation plan and test the new performance remediation plan.

Figure 2:
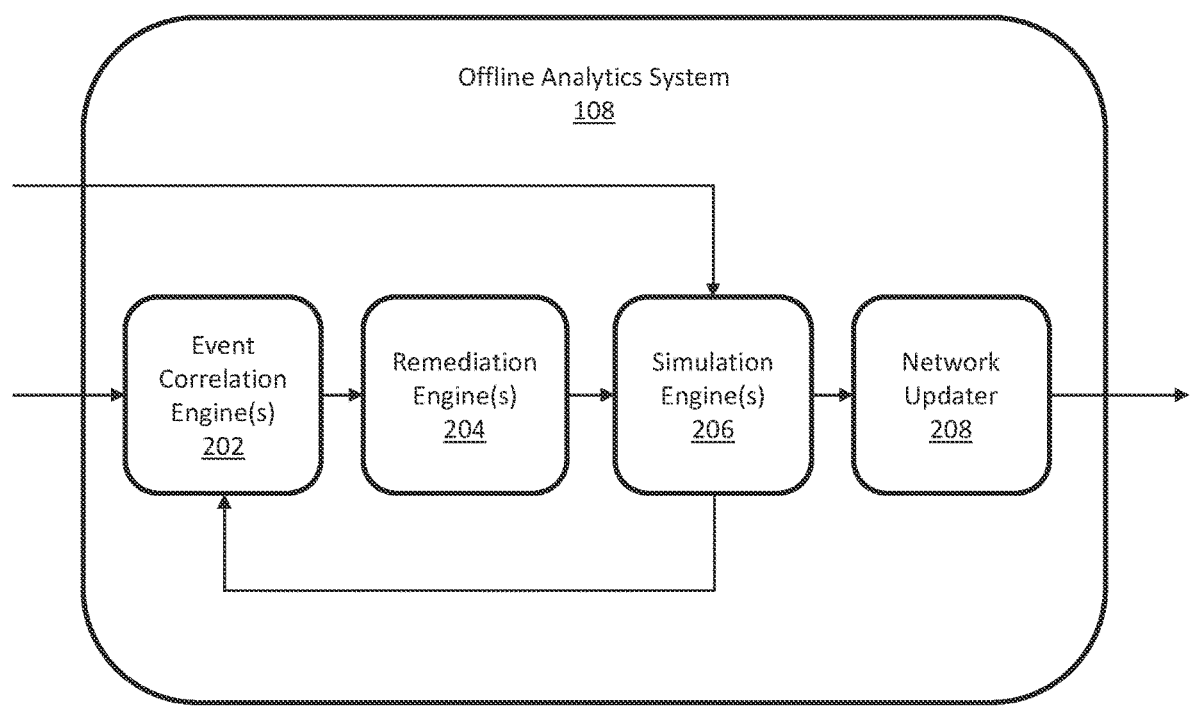
FIG. 2 is a block diagram of the offline analytics system.

FIG. 2 is a block diagram of the offline analytics system 108. The offline analytics system 109 includes one or more event correlation engines 202, one or more remediation engines 204, one or more simulation engines 206, and at least one network updater 208.

The event correlation engines 202 are configured for identifying a performance degradation event in the live production network 102; correlating network log and event data with the performance degradation event; and storing at least some of the network log and event data for simulating the performance degradation event. The event correlation engines 202 can receive the network log and event data from the line production network 102 or from a simulated network simulated on the simulation engines 206.

The remediation engines 204 are configured for determining a production network remediation plan and determining a test plan for the production network remediation plan. Determining a production network remediation plan can include receiving a manual specification of the production network remediation plan from a user or automatically generating the production network remediation plan based on one or more prestored production network remediation plans. For example, receiving a manual specification of the production network remediation plan can include presenting a graphical user interface to the user and receiving input from the user specifying network device configuration changes or network topology changes or both.

Determining a test plan can include determining replay test traffic or instructions generating replay test traffic, which can be traffic generated to mimic real traffic observed in the live production network 102 during or prior to the occurrence of the performance degradation event. Determining a test plan can include determining criteria for validating the production network remediation plan. For example, determining a test plan can include determining a threshold performance value that must be exceeding while executing the test plan in order to validate the production network remediation plan.

Automatically generating the production network remediation plan can include searching the prestored production network remediation plans for a plan associated with a performance degradation similar to the identified performance degradation event. A selected production network remediation plan from the prestored production network remediation plans can be modified to suit the identified production network remediation plan. For example, a network device configuration change from a prestored production network remediation plan can be attributed to a specific network device within the live production network 102.

The simulation engines 206 can include virtual simulation engines, physical emulation engines, or a combination of both. The simulation engines 206 are configured for simulating the live production network 102 using the stored network log and event data and the production network remediation plan. In general, the simulation engines 206 can use any appropriate technique for simulating the live production network 102. The simulated network may not be identical to the live production network 102; the simulation engines 206 can be configured for scaling down the simulated network fabric or simulated traffic or both, e.g., based on a target processing demand or processing speed. The traffic replayed in the simulated network does not need to be packet-for-packet identical to the traffic carried on the live production network 102.

The simulation engines 206 (or any other appropriate component of the offline analytics system 108) can be configured for determining a topology of the live production network 102. Determining the topology can include automatically discovering the topology or receiving manual input from a user specifying the network topology. The offline analytics system 108 can receive copies of control plane signaling from the live production network 102 and use the control plane signaling to reconstruct the live production network 102 or significant portions of the live production network 102 in the simulated network. The offline analytics system 108 can, in some examples, receive Netflow digest information from the live production network 102 and use this information to reconstruct traffic and drive traffic generators in the simulated network.

The simulation engines 206 are configured for executed the test plan and generating a test result for the production network remediation plan based on executing the test plan.

The network updater 208 is configured for deploying a validated remediation plan in the production network. The deployment can be done automatically, e.g., by pushing out changes to components of the live production network 102, or manually, e.g., by instructing a user to carry out the changes to the components of the live production network 102.

In operation, the simulation engines 206 configure the simulated network according to the discovered topology of the live production network 102, the network log and event data, and the production network remediation plan. Then the simulated network is monitored, for example, such that the simulation engines 206 are configured to output data feeds similar to those received from the live production network 102, resulting in receipt of simulated network log and event data at the event correlation engines 202.

If the offline analytics system 108 is not able to validate the production network remediation plan, i.e., due to failing to meet a measured performance threshold as specified in the test plan, then the event correlations engines 202 can begin to repeat the process by analyzing the simulated network log and event data. The remediation engine 204 can determine a new production network remediation plan and the simulation engines 206 can repeat simulating the network with the new production network remediation plan. In this case, the process can repeat while using closed-loop feedback to repeatedly change the production network remediation plan until a production network remediation plan is determined that can be validated and then deployed by the network updater 208. In some examples, if the process repeats a threshold number of times without validating a network remediation plan, the offline analytics system 108 can output a message, e.g., to a network operator or user, requesting assistance or additional data that may be needed.

Figure 3A:
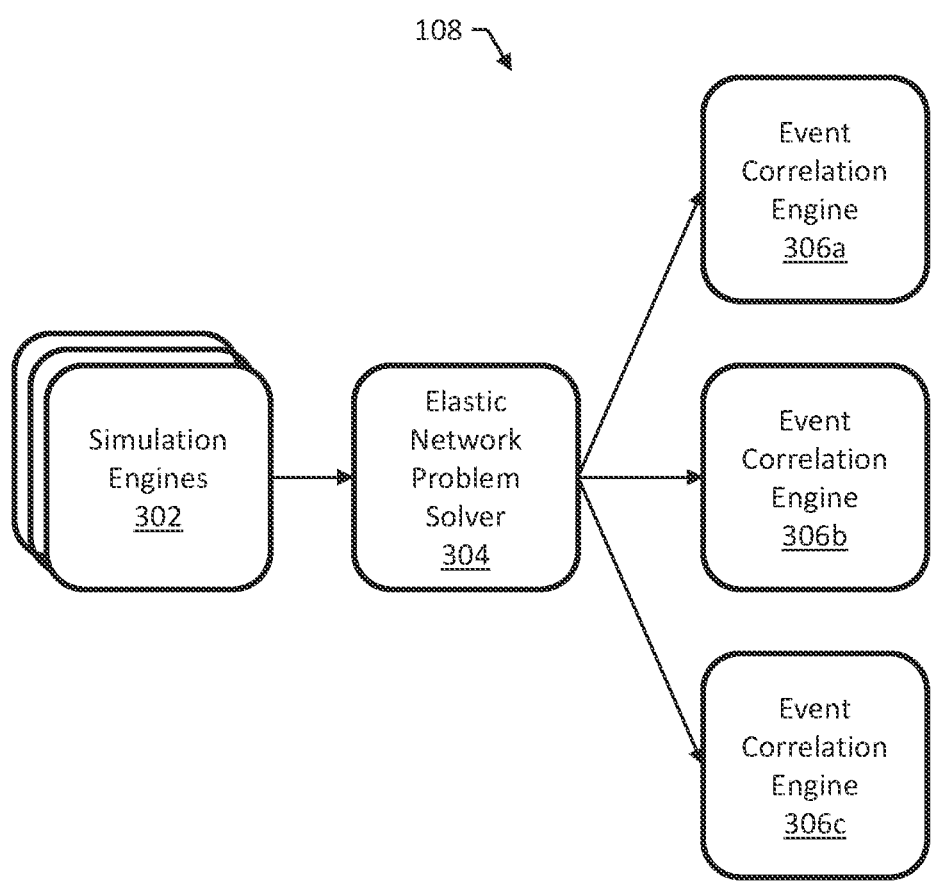
FIG. 3A is a block diagram illustrating the elastic nature of the offline analytics system which can dynamically create and remove instances of event correlation engines to meet processing demands.

FIG. 3A is a block diagram illustrating the elastic nature of the offline analytics system 108 which can dynamically create and remove instances of event correlation engines to meet processing demands. The offline analytics system 108 can dynamically deploy a different number of simulation engines 302 depending on the processing demands involved in simulating the live production network 102, e.g., such that more simulation engines are deployed for simulating larger and/or more complex network topologies.

The offline analytics system 108 can include an elastic network problem solver 304 configured for automatically scaling a number of event correlation engines 306a-c based on a processing demand for identifying performance degradation events. The number of event correlation engines 306a-c can be increased, for example, when the size or complexity of the live production network 102 increases, or when the amount of network log and event data increases. The number of event correlation engines 306a-c can be decreased when the processing demand decreases.

In operation, the event correlation engines 306a-c search for correlations between network conditions and performance degradation events. For example, consider a performance degradation event where a certain link the network fails from time to time. The event correlation engines 306a-c may determine that the link failures are correlated with a networking device exceeding a certain load or producing a certain type of error messaging in the logs for that network device.

In some examples, the event correlation engines 306a-c can create an event replay correlation graph. The event incidents could be a dependency and timeline graph of <event, timeline> node failure(s), link failure(s), node congestion, link congestion, node functional failures (forwarding plane failure, control plane failure).

Figure 3B:
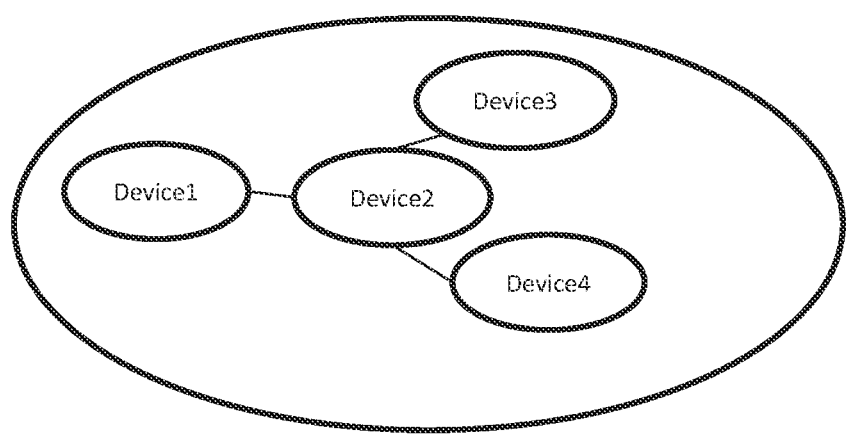
FIG. 3B is a block diagram of example emulated network topology hotspot.

FIG. 3B is a block diagram of example emulated network topology hotspot. A number of hotspots can be spawned for simulation by a simulation engine.

FIG. 3C shows example event correlation graphs for an emulated hotspot for the topology shown in FIG. 3B. In some examples, multiple such graphs can be correlated in parallel to correlate and resolve dependencies across subgraphs and events.

Figure 4:
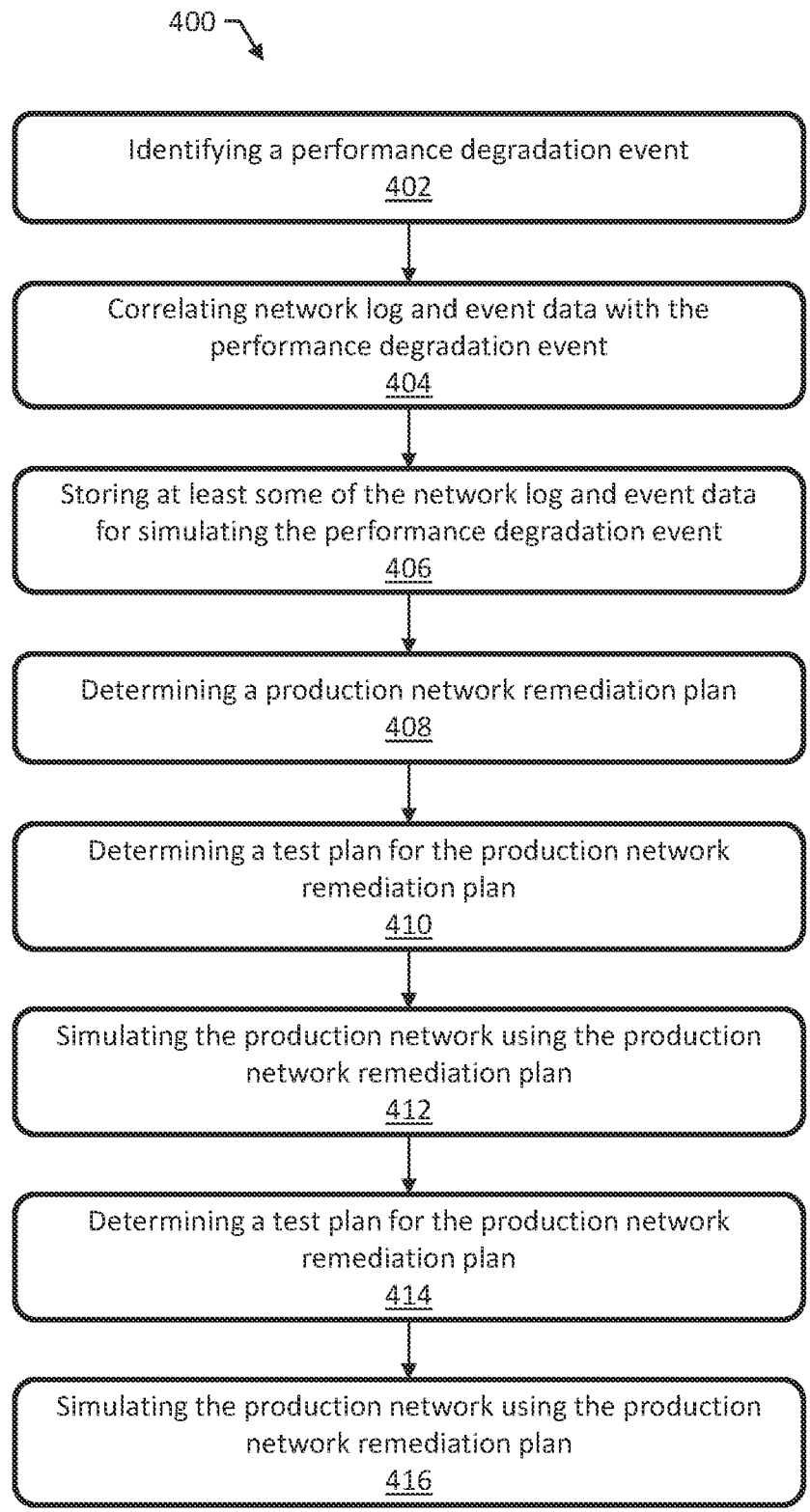
FIG. 4 is a flow diagram of an example method for actively diagnosing and remediating performance degradation in a production network.

FIG. 4 is a flow diagram of an example method 400 for actively diagnosing and remediating performance degradation in a production network. The method 400 can be performed, for example, by the offline analytics system 108 of FIG. 1.

The method 400 includes identifying a performance degradation event in the production network (402). Identifying the performance degradation event in the production network can include analyzing network log and event data. The network log and event data can include one or more of: control and user plane packets, system log information, flow records, and network and device configuration information.

The method 400 includes correlating network log and event data with the performance degradation event (404). The method 400 can include automatically scaling a number of event correlation engines based on a processing demand for identifying performance degradation events. The method 400 includes storing at least some of the network log and event data for simulating the performance degradation event (406).

The method 400 includes determining a production network remediation plan (408). Determining the production network remediation plan can include receiving a manual specification of the production network remediation plan from a user or automatically generating the production network remediation plan based on one or more prestored production network remediation plans or both. The production network remediation plan can include one or more of: network device configuration change information, production network topology change information, test traffic specification information, and production network performance metric target information.

The method 400 includes determining a test plan for the production network remediation plan (410). The method 400 includes simulating the production network using the stored at least some of the network log and event data and the production network remediation plan (412). The method 400 includes executing the test plan (414).

The method 400 includes generating a test result for the production network remediation plan based on executing the test plan (416). The method 400 can include validating the production network remediation plan based on the test result for the production network remediation plan. The method 400 can include deploying a validated remediation plan in the production network.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for actively diagnosing and remediating performance degradation in a production network, the system comprising:
   at least one event correlation engine configured for:
      identifying a performance degradation event in the production network;
      correlating network log and event data with the performance degradation event; and
      storing at least some of the network log and event data for simulating the performance degradation event;
   a remediation engine configured for:
      determining a production network remediation plan; and
      determining a test plan for the production network remediation plan; and
   at least one network simulation engine configured for:
      simulating the production network using the stored at least some of the network log and event data and the production network remediation plan;
      executing the test plan; and
      generating a test result for the production network remediation plan based on executing the test plan; and
   an elastic network problem solver configured for automatically scaling a number of event correlation engines based on a processing demand for identifying performance degradation events.

2. The system of claim 1, comprising a network updater configured for deploying a validated remediation plan in the production network.

3. The system of claim 1, wherein identifying the performance degradation event in the production network comprises analyzing the network log and event data.

4. The system of claim 1, wherein determining the production network remediation plan comprises receiving a manual specification of the production network remediation plan from a user.

5. The system of claim 1, wherein determining the production network remediation plan comprises automatically generating the production network remediation plan based on one or more prestored production network remediation plans.

6. The system of claim 1, wherein the network simulation engine or the remediation engine or both are configured for validating the production network remediation plan based on the test result for the production network remediation plan.

7. The system of claim 1, wherein the network log and event data comprises one or more of: a plurality of control and user plane packets, system log information, flow records, and network and device configuration information.

8. The system of claim 1, wherein the production network remediation plan comprises one or more of: network device configuration change information, production network topology change information, test traffic specification information, and production network performance metric target information.

9. The system of claim 1, comprising a network monitoring system configured for monitoring the production network and, based on monitoring the production network, triggering activation of the event correlation engine.

10. A method for actively diagnosing and remediating performance degradation in a production network, the method comprising:
    identifying a performance degradation event in the production network;
    correlating network log and event data with the performance degradation event;
    storing at least some of the network log and event data for simulating the performance degradation event;
    determining a production network remediation plan;
    determining a test plan for the production network remediation plan;
    simulating the production network using the stored at least some of the network log and event data and the production network remediation plan;
    executing the test plan;
    generating a test result for the production network remediation plan based on executing the test plan; and
    automatically scaling a number of event correlation engines based on a processing demand for identifying performance degradation events.

11. The method of claim 10, comprising deploying a validated remediation plan in the production network.

12. The method of claim 10, wherein identifying the performance degradation event in the production network comprises analyzing the network log and event data.

13. The method of claim 10, wherein determining the production network remediation plan comprises receiving a manual specification of the production network remediation plan from a user.

14. The method of claim 10, wherein determining the production network remediation plan comprises automatically generating the production network remediation plan based on one or more prestored production network remediation plans.

15. The method of claim 10, comprising validating the production network remediation plan based on the test result for the production network remediation plan.

16. The method of claim 10, wherein the network log and event data comprises one or more of: a plurality of control and user plane packets, system log information, flow records, and network and device configuration information.

17. The method of claim 10, wherein the production network remediation plan comprises one or more of: network device configuration change information, production network topology change information, test traffic specification information, and production network performance metric target information.

18. A non-transitory computer readable medium comprising computer executable instructions embodied in the non-transitory computer readable medium that when executed by at least one processor of at least one computer cause the at least one computer to perform steps comprising:
   identifying a performance degradation event in a production network;
   correlating network log and event data with the performance degradation event;
   storing at least some of the network log and event data for simulating the performance degradation event;
   determining a production network remediation plan;
   determining a test plan for the production network remediation plan;
   simulating the production network using the stored at least some of the network log and event data and the production network remediation plan;
   executing the test plan;
   generating a test result for the production network remediation plan based on executing the test plan; and
   automatically scaling a number of event correlation engines based on a processing demand for identifying performance degradation events.

* * * * *